United States Patent
Iida et al.

(10) Patent No.: US 10,819,243 B2
(45) Date of Patent: Oct. 27, 2020

(54) ISOLATED DC/DC CONVERTER, CONTROL UNIT FOR ISOLATED DC/DC CONVERTER, AND DC/AC CONVERTER

(71) Applicant: FUJI ELECTRIC CO., LTD., Kanagawa (JP)

(72) Inventors: Takashi Iida, Hino (JP); Yukihiro Nishikawa, Kodaira (JP)

(73) Assignee: FUJI ELECTRIC CO., LTD., Kawasaki-shi, Kanagawa (JP)

( * ) Notice: Subject to any disclaimer, the term of this patent is extended or adjusted under 35 U.S.C. 154(b) by 0 days.

(21) Appl. No.: 16/279,202

(22) Filed: Feb. 19, 2019

(65) Prior Publication Data

US 2019/0312519 A1   Oct. 10, 2019

(30) Foreign Application Priority Data

Apr. 6, 2018   (JP) .................................. 2018-073819

(51) Int. Cl.
   *H02M 3/335*   (2006.01)
   *H02M 1/00*   (2006.01)
   *H02M 7/5387*   (2007.01)

(52) U.S. Cl.
   CPC ... *H02M 3/33569* (2013.01); *H02M 3/33507* (2013.01); *H02M 7/5387* (2013.01); *H02M 2001/0025* (2013.01)

(58) Field of Classification Search
   CPC .......... H02M 3/28; H02M 7/48; H02M 3/335; H02M 3/33567; H02M 3/33569; H02M 3/33507; H02M 3/33576; H02M 2001/0048; H02M 2001/0009; H02M 2001/0025; H02M 1/4241; H02M 7/53; H02M 2007/4815

See application file for complete search history.

(56) References Cited

U.S. PATENT DOCUMENTS

| | | | | |
|---|---|---|---|---|
| 5,644,206 | A | * | 7/1997 | Yura ....................... H02P 21/06 318/800 |
| 10,079,545 | B2 | | 9/2018 | Nishikawa et al. |
| 2010/0127665 | A1 | * | 5/2010 | Mitsutani ................ B60L 50/61 320/137 |

(Continued)

FOREIGN PATENT DOCUMENTS

JP   2015-177595   10/2015

*Primary Examiner* — Gustavo A Rosario-Benitez
(74) *Attorney, Agent, or Firm* — IPUSA, PLLC

(57) ABSTRACT

An isolated DC/DC converter includes: DC/AC converter; an isolation transformer; a rectifier circuit; and a control unit. The control unit includes a DC input power calculation unit that calculates a DC input power of the DC/AC converter; a first adjustment unit that calculates a DC input power command value such that a DC output voltage detection value follows a DC output voltage command value; an input power limit unit that limits an upper limit value of the DC input power command value to a predetermined value and output the DC input power command value; a second adjustment unit that calculates a DC output power command value such that a DC input power calculation value follows the DC input power command value; and a drive pulse generation unit that generates drive pulses for semiconductor switching device based on the DC output power command value.

6 Claims, 5 Drawing Sheets

(56) References Cited

U.S. PATENT DOCUMENTS

| | | | | |
|---|---|---|---|---|
| 2011/0026281 A1* | 2/2011 | Chapman | ............... | H02J 3/38 |
| | | | | 363/65 |
| 2013/0334212 A1* | 12/2013 | Sawada | ............... | H02M 5/458 |
| | | | | 219/662 |
| 2014/0032145 A1* | 1/2014 | Yoo | ............... | G01R 27/26 |
| | | | | 702/65 |
| 2015/0002072 A1* | 1/2015 | Mo | ............... | H02P 23/28 |
| | | | | 318/807 |
| 2015/0365010 A1* | 12/2015 | Abe | ............... | H02M 1/36 |
| | | | | 363/37 |
| 2019/0241088 A1* | 8/2019 | Kimura | ............... | B60L 53/22 |

* cited by examiner

ISOLATED DC/DC CONVERTER, CONTROL UNIT FOR ISOLATED DC/DC CONVERTER, AND DC/AC CONVERTER

CROSS-REFERENCE TO RELATED APPLICATION

The present application is based on and claims priority to Japanese Patent Application No. 2018-073819 filed on Apr. 6, 2018, the entire contents of which are hereby incorporated by reference.

BACKGROUND OF THE INVENTION

1. Field of the Invention

The present invention relates to an isolated DC/DC converter, a control unit for the isolated DC/DC converter, and a DC/AC converter.

2. Description of the Related Art

FIG. 4 is a circuit diagram of an isolated DC/DC converter described in Patent Document 1. In FIG. 4, the isolated DC/DC converter includes a smoothing capacitor 51 connected between input terminals a and b to which a direct-current voltage $V_{in}$ is applied; semiconductor switching device 52a, 52b, 52c and 52d constituting a DC/AC converter 52; a resonance capacitor 53; a resonance reactor 54; an isolation transformer 55; a switch 56 for connecting a coil 57 in parallel to a primary winding of the isolation transformer 55; a coil constituting a parallel resonance inductance; a rectifier circuit 59; and a smoothing capacitor 60. Output terminals c and d are connected to both ends of the smoothing capacitor 60, and a direct current voltage $V_{out}$ is output. Here, the switch 56 and the coil 57 constitute a circuit that adjusts the parallel resonance inductance of the coil 58. Also, respective values detected by a voltage detector 71 and a current detector 72 are input to a control unit 70. This control unit 70 controls on/off of the DC/AC converter 52 and the switch 56.

In this isolated DC/DC converter, in a predetermined range of input/output voltage, for example, in a range of 320 [V] to 440 [V] including the rated value of input voltage, the switch 56 is turned off such that only the coil 58 is connected in parallel to the primary winding of the isolation transformer 55 is connected. Also, in a voltage range other than the above, the switch 56 is turned on and the coils 57 and 58 are connected in parallel to substantially reduce the parallel resonance inductance of the coil 58. Thus, when the input voltage is in the range of 320 [V] to 440 [V], the parallel resonance current flowing to the primary side of the isolation transformer 55 is reduced to reduce the power losses of the entire circuit.

RELATED-ART DOCUMENTS

Patent Document

[Patent Document 1] Japanese Laid-open Patent Publication No. 2015-177595 (paragraphs [0040] to [0056 and FIG. 1 to FIG. 5])

FIG. 5 illustrates the power loss reduction effect by the isolated DC/DC converter of FIG. 4. As illustrated in FIG. 5, in this isolated DC/DC converter, by controlling the switch 56 to adjust the parallel resonance inductance, it is possible to reduce the power losses as a whole compared with a conventional design.

However, as apparent from FIG. 5, the power loss reduction effect is exclusively due to the semiconductor switching devices 52a, 52b, 52c, and 52d of the DC/AC converter 52, the resonance reactor 54, and the coil 58, and the power losses in the isolation transformer 55 do not substantially change.

On the other hand, for example, in the field of a power supply device mounted on a vehicle, an AC power supply system that converts a DC output voltage of an isolated DC/DC converter into an AC voltage by an inverter and supplies the AC voltage to the outside is known. In this type of an AC power supply system, in order to manufacture an isolation transformer that can cope with the AC maximum output of an inverter for the purpose of increasing the capability of the power supply, it is inevitable to design the excitation inductance to be small, and as a result, the excitation current increases.

Thus, because an input current determined depending on a load current and the excitation current of the isolation transformer also increases, the copper loss increases and the efficiency decreases. This causes a problem that the cooling capability is required to be enhanced and the device is increased in size and the cost is increased.

In the isolated DC/DC converter described in Patent Document 1, the power loss of the entire device in a predetermined input/output voltage range can be reduced. However, because the power loss of the isolation transformer itself does not substantially changes, further power loss reduction is required.

Therefore, an object of the present invention is to provide an isolated DC/DC converter, a control unit for the isolated DC/DC converter, and a DC/AC converter including the isolated DC/DC converter and the isolated DC/DC converter that can reduce the power losses of an isolation transformer to enhance the efficiency.

SUMMARY OF THE INVENTION

In view of the above, according to an embodiment, an isolated DC/DC converter includes: a DC/AC converter configured to perform DC/AC conversion by an operation of semiconductor switching devices; an isolation transformer configured to isolate an AC output voltage of the DC/AC converter to transform the AC output voltage to a predetermined magnitude; a rectifier circuit configured to convert the AC output voltage of the isolation transformer into a DC voltage; and a control unit configured to drive the semiconductor switching devices, wherein the control unit includes a DC input power calculation unit configured, to calculate a DC input power of the DC/AC converter; a first adjustment unit configured to calculate a DC input power command value such that a DC output voltage detection value of the rectifier circuit follows a DC output voltage command value; an input power limit unit configured to limit an upper limit value of the DC input power command value to a predetermined value and output the DC input power command value; and a second adjustment unit configured to calculate a DC output power command value of the rectifier circuit such that a DC input power calculation value by the DC input power calculation unit follows the DC input power command value limited by the input power limit unit; and a drive pulse generation unit configured to generate drive pulses for the semiconductor switching device based on the DC output power command value.

According to an embodiment, because the upper limit value of the DC input power of the DC/AC converter constituting the isolated DC/DC converter is limited, it is possible to reduce the input power of the isolation transformer and to design the excitation inductance of the isolation transformer to be a large value. Thereby, it is possible to reduce the excitation current and the input current of the isolation transformer to reduce copper losses. Further, it is possible to reduce the entire power loss of the isolation transformer, and to enhance the efficiency of the isolated DC/DC converter and the DC/AC converter including the isolated DC/DC converter. Therefore, it is unnecessary to enhance a cooling capability of a device more than necessary, and it is possible to prevent the entire device from being increased in cost or size.

DETAILED DESCRIPTION OF THE EMBODIMENTS

Figure 1:
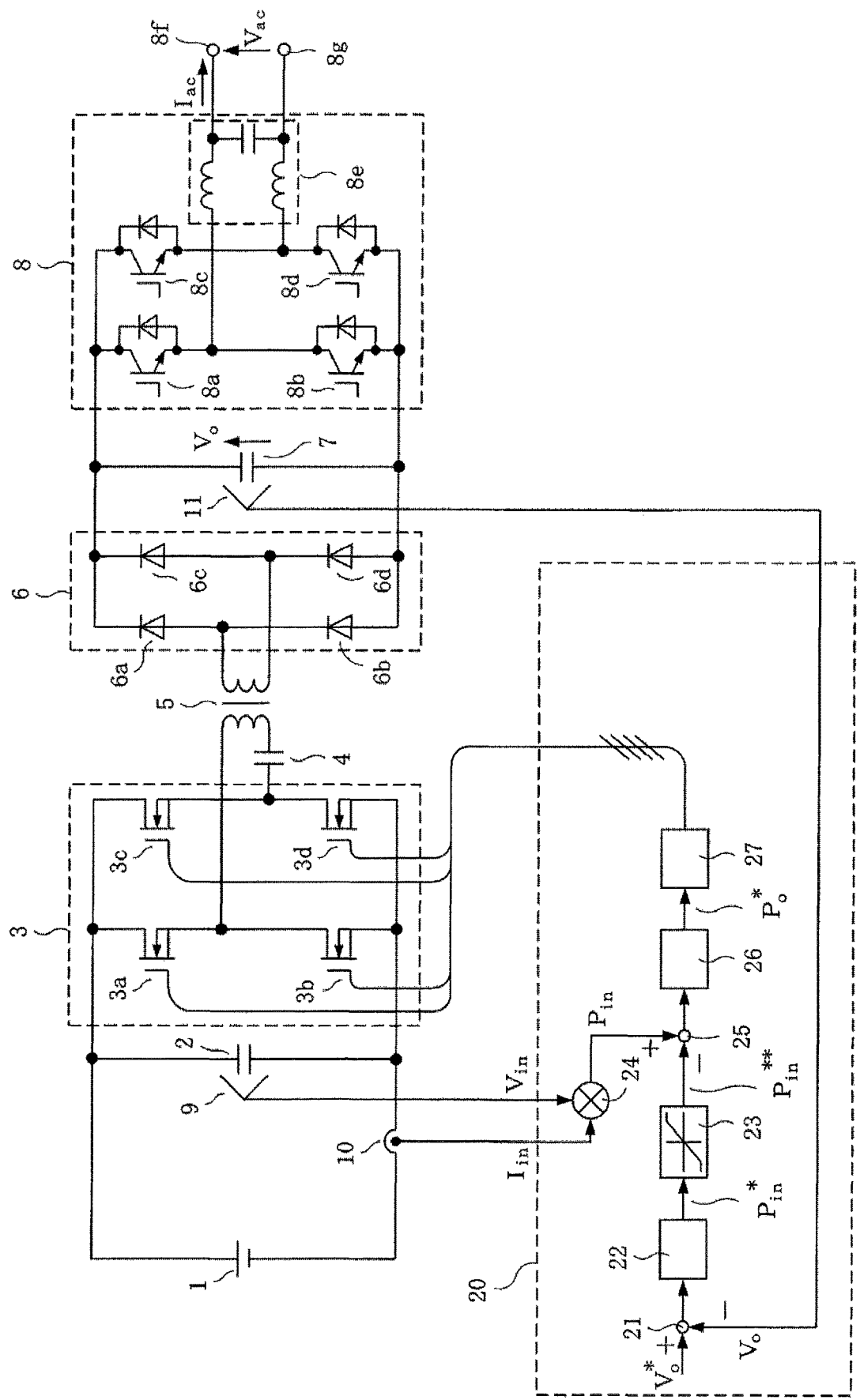
FIG. 1 is a circuit diagram of a DC/AC converter including an isolated DC/DC converter according to an embodiment of the present invention.

Before describing an embodiment, aspects of the present invention will be described.

According to a first aspect, an isolated DC/DC converter includes: a DC/AC converter configured to perform DC/AC conversion by an operation of semiconductor switching devices; an isolation transformer configured to isolate an AC output voltage of the DC/AC converter to transform the AC output voltage to a predetermined magnitude; a rectifier circuit configured to convert the AC output voltage of the isolation transformer into a DC voltage; and a control unit configured to drive the semiconductor switching devices, wherein the control unit includes a DC input power calculation unit configured to calculate a DC input power of the DC/AC converter; a first adjustment unit configured to calculate a DC input power command value such that a DC output voltage detection value of the rectifier circuit follows a DC output voltage command value; an input power limit unit configured to limit an upper limit value of the DC input power command value to a predetermined value and output the DC input power command value; and a second adjustment unit configured to calculate a DC output power command value of the rectifier circuit such that a DC input power calculation value by the DC input power calculation unit follows the DC input power command value limited by the input power limit unit; and a drive pulse generation unit configured to generate drive pulses for the semiconductor switching element based on the DC output power command value.

According to a second aspect, in the isolated DC/DC converter according to the first aspect, the predetermined value in the input power limit unit is set based on a design value of an excitation inductance of the isolation transformer.

According to a third aspect, a control unit for an isolated DC/DC converter, which includes a DC/AC converter configured to perform DC/AC conversion by an operation of semiconductor switching devices; an isolation transformer configured to isolate an AC output voltage of the DC/AC converter to transform the AC output voltage to a predetermined magnitude; and a rectifier circuit configured to convert the AC output voltage of the isolation transformer into a DC voltage, and for generating driving pulses for the semiconductor switching devices includes: a DC input power calculation unit configured to calculate a DC input power of the DC/AC converter; a first adjustment unit configured to calculate a DC input power command value such that a DC output voltage detection value of the rectifier circuit follows a DC output voltage command value; an input power limit unit configured to limit an upper limit value of the DC input power command value to a predetermined value and output the DC input power command value; a second adjustment unit configured to calculate a DC output power command value of the rectifier circuit such that a DC input power calculation value by the DC input power calculation unit follows the DC input power command value limited by the input power limit unit; and a drive pulse generation unit configured to generate the drive pulses for the semiconductor switching device based on the DC output power command value.

According to a fourth aspect, in the control unit for the isolated DC/DC converter according to the third aspect, the predetermined value in the input power limit unit is set based on a design value of an excitation inductance of the isolation transformer.

According to a fifth aspect, a DC/AC converter includes the isolated DC/DC converter according to the first aspect; and an inverter configured to convert a DC output voltage of the rectifier circuit into an AC voltage.

According to a sixth aspect, in the isolated DC/AC converter according to the fifth aspect, the predetermined value in the input power limit unit is set to be approximately 1.5 times of a rated AC output power of the inverter.

In the following, an embodiment of the present invention will be described with reference to the drawings.

FIG. 1 is a circuit diagram of a DC/AC converter including an isolated DC/DC converter according to the present embodiment. First, a main circuit configuration will be described.

In FIG. 1, a smoothing capacitor 2 is connected between the positive and negative electrodes of a DC power supply 1, and both of the smoothing capacitor 2 ends are connected to the DC input side of a DC/AC converter 3 composed of semiconductor switching devices 3a, 3b, 3c, and 3d.

A primary winding of an isolation transformer 5 is connected between the AC output terminals of the DC/AC converter 3 via a resonance capacitor 4, and both ends of the secondary winding are connected to the AC input side of a rectifier circuit 6 composed of diodes 6a, 6b, 6c, and 6d.

A smoothing capacitor 7 is connected between the DC output terminals of the rectifier circuit 6 and both ends of the smoothing capacitor 7 are connected to the DC input side of a single-phase inverter 8 including a bridge circuit of semiconductor switching devices 8a, 8b, 8c, and 8d and an output filter 8e. Note that AC output terminal 8f and 8g are terminals where the AC voltage $V_{ac}$ and the AC current $I_{ac}$ are output.

The types of the semiconductor switching devices constituting the DC/AC converter 3 and the single-phase inverter 8 are not limited to the illustrated example, and, in accordance with the ratings and specifications of a device, desired types of elements such as FETs, IGBTs, or power transistors may be selected as appropriate.

Next, a configuration of a control unit 20 for the DC/AC converter 3 will be described. Note that because a control unit for the inverter 8 is not a main part of the present invention, illustration and description thereof will be omitted for the sake of convenience.

In the above described main circuit, a voltage detector 9 that detects a DC input voltage $V_{in}$ of the DC/AC converter 3, a current detector 10 that detects a DC input current $I_{in}$, and a voltage detector 11 that detects a DC output voltage $V_o$ of the DC/DC converter (DC intermediate voltage of the DC/AC converter) are provided. The respective values $V_{in}$, $I_{in}$, and $V_o$ detected by these detectors 9 to 11 are input to the control unit 20.

In the control unit 20, an output voltage command value $V_o^*$ and the output voltage detection value $V_o$ of the DC/DC converter are input to a subtractor 21, and a first regulator 22 composed of a regulator such as a P (proportional) regulator and a PI (proportional integral) regulator operates such that the output voltage detection value $V_o$ follows the output voltage command value $V_o^*$ to calculate a first input power command value $P_{in}^*$. The first input power command value $P_{in}^*$ is input to a power limiter 23, and a second input power command value $P_{in}^{**}$ with an upper limit value limited by a power limit value $P_{lim}$ is calculated.

On the other hand, an input power detection value $P_{in}$ obtained by a multiplier 24 multiplying the input voltage detection value $V_{in}$ by the input current detection value $I_{in}$ is input to a subtractor 25 together with the second input power command value $P_{in}^{}$. The deviation between the input power detection value $P_{in}$ and the second input power command value $P_{in}^{}$ is input to a second regulator 26 composed of a regulator such as a P regulator and a PI regulator.

The second regulator 26 calculates an output power command value $P_o^*$ such that the above described deviation becomes zero and outputs the power command value $P_o^*$ to a drive pulse generator 27.

The drive pulse generator 27 performs a PWM (pulse width modulation) calculation or the like based on the output power command value $P_o^*$ to generate drive pulses each of which has a predetermined frequency, a pulse width, and a phase, and supplies the drive pulses to the switching devices 3a, 3b, 3c, and 3d of the DC/AC converter 3 to turn on/off the switching devices 3a, 3b, 3c, and 3d.

Figure 2:
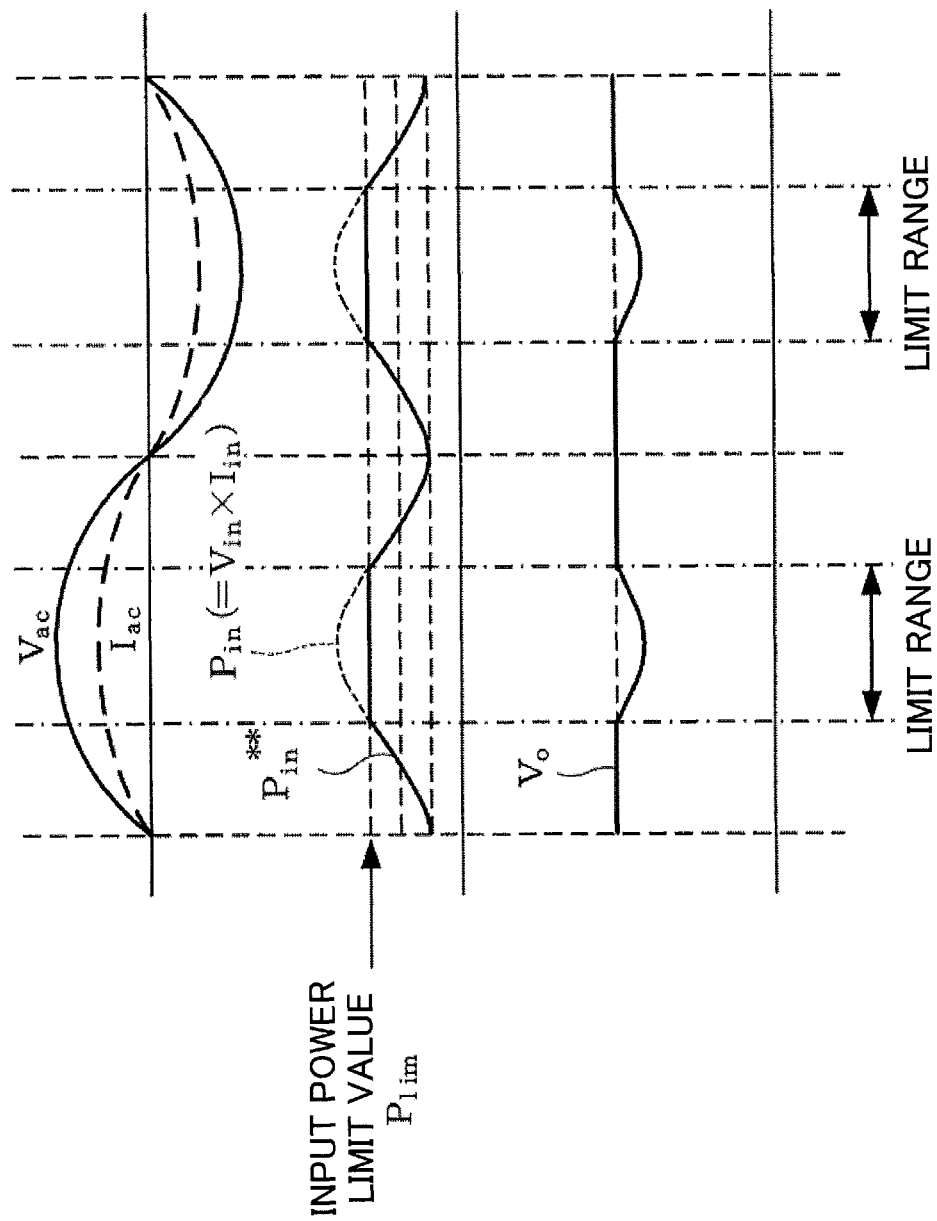
FIG. 2 is a schematic waveform diagram that describes an operation of FIG. 1.

Next, FIG. 2 is a schematic waveform diagram that describes an operation of the present embodiment, and illustrates the AC output voltage $V_{ac}$ and the AC output current $I_{ac}$ of the inverter 8 of FIG. 1, the second input power command value $P_{in}^{**}$, the input power detection value $P_{in}$, and the DC output voltage $V_o$.

In this embodiment, although the input power detection value $P_{in}$ tries to change in accordance with instantaneous power that is output from the inverter 8, the second regulator 26 operates to generate the output power command value $P_o^*$ such that the input power detection value $P_{in}$ follows the second input power command value $P_{in}^{**}$ whose upper limit value is limited by the power limit value $P_{lim}$ of the input power limiter 23. Based on the generated output power command value $P_o^*$, the switching devices 3a, 3b, 3c and 3d of the DC/AC converter 3 are driven.

Therefore, the input power of the DC/AC converter 3 follows the second input power command value $P_{in}^{**}$ to be smaller than the original input power (first input power command value $P_{in}^*$) required for the instantaneous power that is output from the inverter 8.

Therefore, within the limit ranges illustrated in FIG. 2, the DC output voltage (the voltage of the smoothing capacitor 7) $V_o$ decreases as illustrated.

Figure 3:
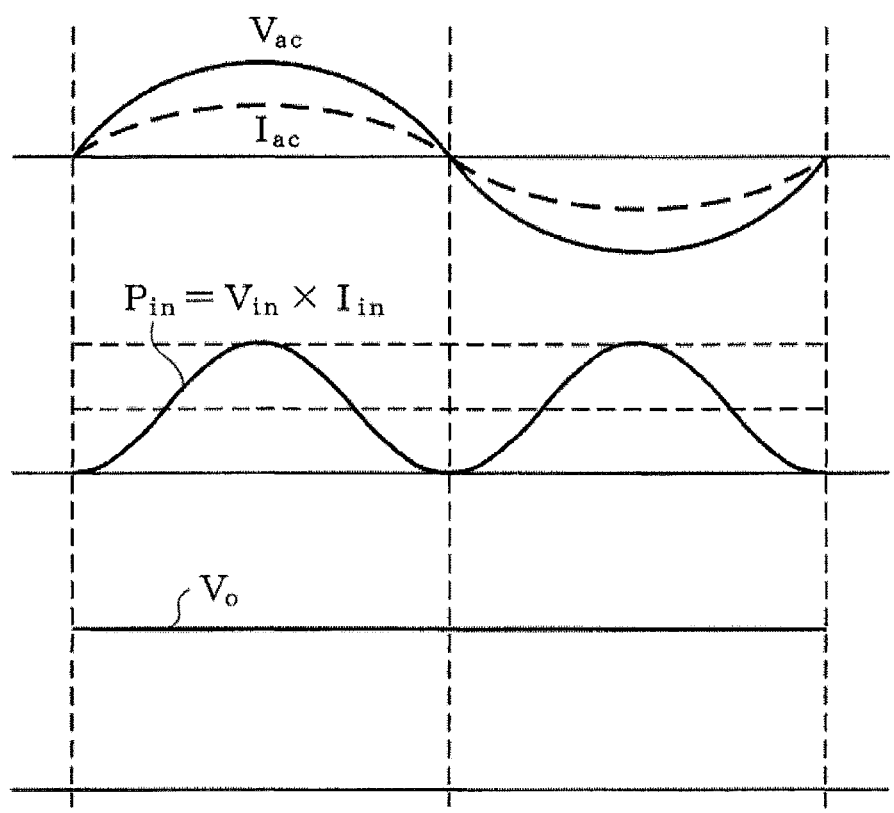
FIG. 3 is a schematic waveform diagram of a case where the input power command value is not limited.
Figure 4:
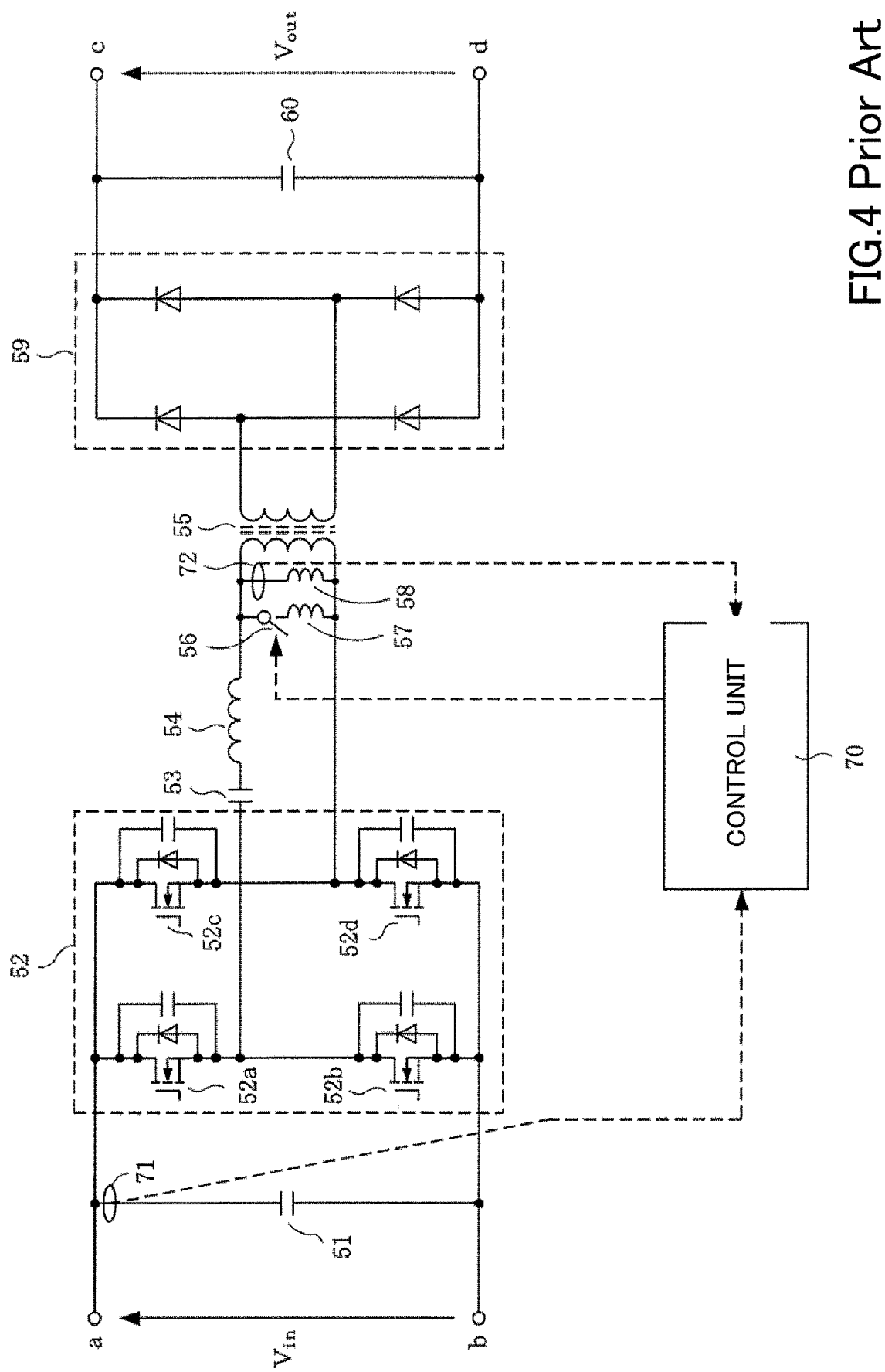
FIG. 4 is a circuit diagram of an isolated DC/DC converter described in Patent Document 1.
Figure 5:
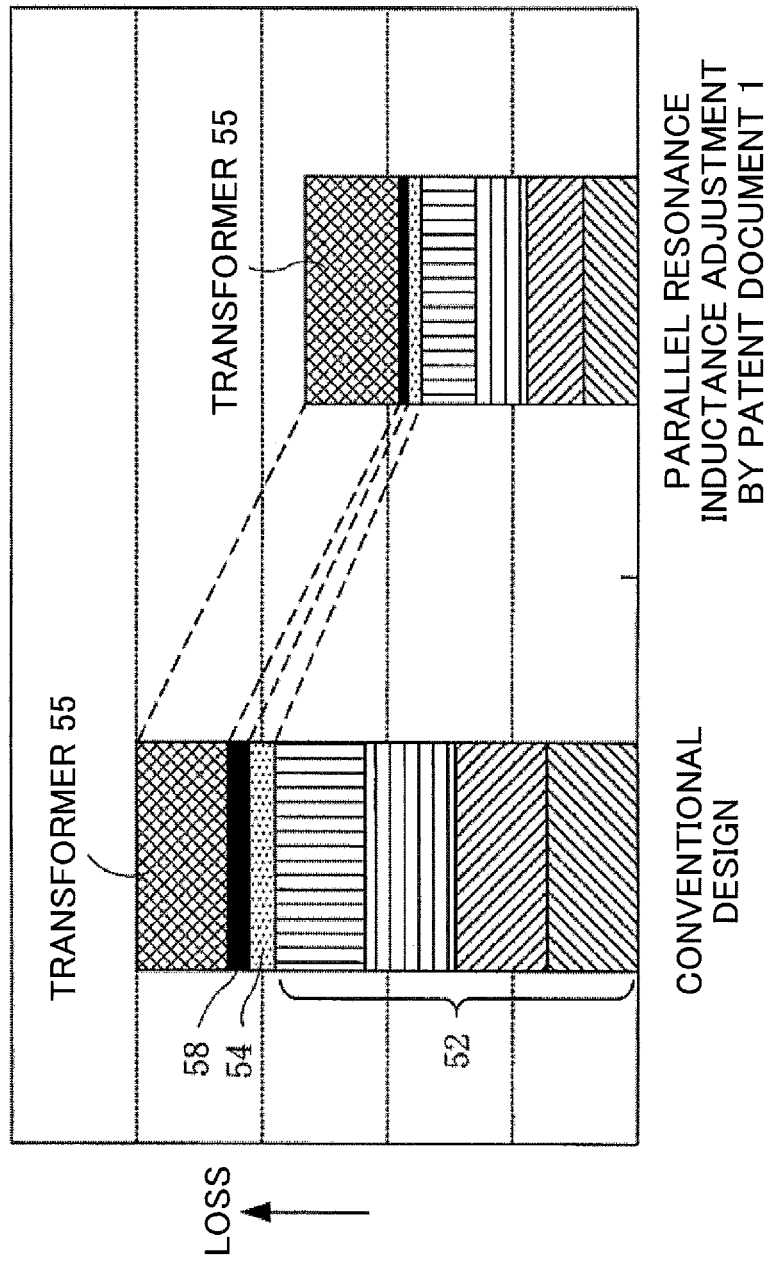
FIG. 5 is a diagram that describes a power loss reduction effect by an isolated DC/DC converter described in Patent Document 1.

Note that FIG. 3 is a schematic waveform diagram of a case of controlling the DC/AC converter 3 without limiting the DC input power of the DC/AC converter 3 (hereinafter referred to as comparison technique) as in the embodiment described above, and the DC output voltage $V_o$ is kept substantially constant.

According to the embodiment of the present invention, because the DC/AC converter 3 is controlled such that the upper limit value of the DC input power command value is limited and the peak value of the DC input power is reduced, it is possible to reduce the input power of the isolation transformer 5 and to design the excitation inductance of the isolation transformer 5 to be large as compared with the comparison technique that does not limit the DC input power command value. Because this reduces the excitation current of the isolation transformer 5, the input current of the isolation transformer 5, determined depending on the load current and the exciting current, decreases, and the copper losses decrease.

Therefore, it is unnecessary to enhance the cooling capability more than necessary, and it is possible to prevent the device from being increased in cost or size due to an increase in the capability of the cooling device.

Note that when the excitation inductance of the isolation transformer 5 is designed to be large, the iron loss increases because the magnetic flux density increases. However, by appropriately selecting the constants of the isolation transformer 5, such as the excitation inductance and the turn ratio, to set the power limit value $P_{lim}$ and the second input power command value $P_{in}^{**}$ as appropriate, the effect due to the decrease in the copper loss exceeds that of the increase in the iron loss, and the power loss of the isolation transformer 5 as a whole can be reduced.

Also, when limiting the original DC input power command value (the first input power command value $P_{in}^{**}$) as in the embodiment, there may be a case in which the DC output voltage $V_o$ is distorted and the instantaneous value of the AC output voltage $V_{ac}$ of the inverter 8 is affected to a certain extent. However, for the isolated DC/AC converter in which the isolated DC/DC converter and the inverter 8 are combined as illustrated in FIG. 1, a strict constant voltage is not required as the DC output voltage $V_o$ of the DC/DC converter, and even if there is some distortion in the DC output voltage (DC intermediate voltage of the DC/AC converter) $V_o$, it does not become a problem in view of the quality of the AC output voltage $V_{ac}$.

Next, the results of verifying experimentally the power loss reduction effect of the isolation transformer according to the present embodiment will be described.

Table 1 below indicates design conditions of input/output of a DC/AC converter including an isolated DC/DC converter for a comparison technique (in which the DC/AC converter is controlled without limiting the DC input power) and the present embodiment.

TABLE 1

|  |  | COMPARISON TECHNIQUE | EMBODIMENT |  |
|---|---|---|---|---|
| DC INPUT VOLTAGE | MINIMUM VALUE | 200 [V] |  | $V_{in}$ |
|  | MAXIMUM VALUE | 400 [V] |  |  |
| DC OUTPUT VOLTAGE |  | 400 [V] |  | ...$V_o$ |
| AC OUTPUT POWER |  | 1500 [W] |  | (RATED OUTPUT POWER OF INVERTER) |
| MAXIMUM PEAK POWER |  | 3000 [W] | 2250 [W] | ...$P_{in}$ |
| RESONANCE FREQUENCY |  | 100 [kHz] |  |  |

In Table 1, the minimum value and the maximum value of the DC input voltage correspond to $V_{in}$ in FIG. 1, the DC output voltage corresponds to $V_o$, the AC output power corresponds to the rated output power of the inverter 8, and the maximum peak power Corresponds to the peak value of $P_{in}$.

In this embodiment, the second input power command value $P_{in}^{**}$ is limited by the input power limiter so that the maximum peak power becomes 2250 [W]. That is, the power limit value $P_{lim}$ in the input power limiter 23 is set to be 2250 [W] that is 1.5 times the rated output power (=1500 [W]) of the inverter 8. Also, the resonance frequency in Table 1 is the resonance frequency of a resonance circuit constituted by the resonance capacitor 4 on the primary side of the isolation transformer 5 and the leakage inductance.

Table 2 indicates a design example of constants of the resonance capacitor 4 and the isolation transformer 5. According to the present embodiment, the excitation inductance of the isolation transformer 5 is designed to be a value that is larger than that of the comparison technique by approximately 33%.

TABLE 2

|  |  | COMPARISON TECHNIQUE | EMBODIMENT |
|---|---|---|---|
| RESONANCE CAPACITOR CAPACITY |  | 0.208 [μH] | 0.156 [μH] |
| ISOLATION TRANSFORMER CONSTANT | TURN RATIO | 0.75:1 | 0.75:1 |
|  | SERIES INDUCTANCE | 12 [μH] | 16 [μH] |
|  | EXCITATION INDUCTANCE | 66 [μH] | 88 [μH] |

Next, Table 3 indicates the power loss calculation results of the isolation transformer 5.

By comparing the embodiment of the present invention with the comparison technique, it is found that although the iron loss slightly increases in the embodiment, the copper losses of the primary winding and the secondary winding are remarkably reduced in the embodiment. Therefore, it is found that the power loss of the entire isolation transformer is significantly reduced in the embodiment.

TABLE 3

|  | TRANSFORMER PRIMARY CURRENT [A] (rms) | TRANSFORMER SECONDARY CURRENT [A] (rms) | TRANSFORMER COPPER LOSS (PRIMARY) [W] | TRANSFORMER COPPER LOSS (SECONDARY) [W] | IRON LOSS [W] | TRANSFORMER LOSS (TOTAL) [W] |
|---|---|---|---|---|---|---|
| COMPARISON TECHNIQUE | 13.0 | 7.9 | 17.2 | 6.7 | 3.9 | 27.8 |
| EMBODIMENT | 9.4 | 5.7 | 8.9 | 3.4 | 4.8 | 17.1 |

An embodiment of the present invention can be used as various DC power supply devices that isolate a DC power supply voltage to obtain a DC voltage of a predetermined magnitude, and can be used an AC power supply device that causes an inverter to convert an output voltage of an isolated DC/DC converter into an AC voltage of a predetermined magnitude and a frequency to output the AC voltage.

What is claimed is:

1. An isolated DC/DC converter comprising: a DC/AC converter including semiconductor switching devices and configured to perform I)C/AC conversion y an operation of the semiconductor switching devices; an isolation transformer configured to isolate an AC output voltage of the DC/AC converter to transform the AC output voltage to a predetermined magnitude; a rectifier circuit configured to convert the AC output voltage of the isolation transformer into a DC voltage; and a control unit configured to drive the semiconductor switching devices, wherein the control unit includes a DC input power calculation unit configured to calculate a DC input power of the DC/AC converter; a first adjustment unit configured to calculate a DC input power command value such that a DC output voltage detection value of the rectifier circuit follows a DC output voltage command value: an input power limit unit configured to limit an upper limit value of the DC input power command value to a predetermined value and output the DC input power command value in order to reduce a peak value of the DC input power of the I)C/AC converter: a second adjustment unit configured to calculate a DC output power command value of the rectifier circuit such that a DC input power calculation value by the DC input power calculation unit follows the DC input power command value limited by the input power limit unit; and a drive pulse generation unit configured to generate drive pulses to turn on/off the semiconductor switching device based on the DC output power command value; wherein by limiting the upper limit value of the DC input current command value to the predetermined value, the DC output voltage detection value of the rectifier circuit decreases, with respect to the DC output voltage command value, temporarily at a constant interval.

2. The isolated DC/DC converter according to claim 1, wherein the predetermined value in the input power limit unit is set based on a design value of an excitation inductance of the isolation transformer.

3. A control unit for an isolated DC/DC converter, which includes a DC/AC converter including semiconductor switching devices and configured to perform DC/AC conversion by an operation of the semiconductor switching devices; an isolation transformer configured to isolate an AC output voltage of the DC/AC converter to transform the AC output voltage to a predetermined magnitude; and a rectifier circuit configured to convert the AC output voltage of the isolation transformer into a DC voltage, and for generating driving pulses for the semiconductor switching devices, the control unit comprising: a DC input power calculation unit configured to calculate a DC input power of the DC/AC converter; a first adjustment unit configured to calculate a DC input power command value such that a DC output voltage detection value of the rectifier circuit follows a DC output voltage command value; an input power limit unit configured to limit an tipper limit value of the DC input power command value to a predetermined value and output the DC input power command value in order to reduce a peak value of the DC input power of the DC/AC converter; a second adjustment unit configured to calculate a DC output power command value of the rectifier circuit such that a DC input power calculation value by the DC input power calculation unit follows the DC input power command value limited by the input power limit unit; and a drive pulse generation unit configured to generate the drive pulses to turn on/off the semiconductor switching device based on the DC output power command value; wherein by limiting the upper limit value of the DC input current command value to the predetermined value, the DC output voltage detection value of the rectifier circuit decreases, with respect to the DC output voltage command value, temporarily at a constant interval.

4. The control unit for the isolated DC/DC converter according to claim 3, wherein the predetermined value in the input power limit unit is set based on a design value of an excitation inductance of the isolation transformer.

5. A DC/AC converter comprising;
the isolated DC/DC converter according to claim 1; and
an inverter configured to convert a DC output voltage of the rectifier circuit into an AC voltage.

6. The DC/AC converter according to claim 5, wherein the predetermined value in the input power limit unit is set to be approximately 1.5 times of a rated AC output power of the inverter.

* * * * *